(12) United States Patent
 Lin et al.

(10) Patent No.: US 11,474,311 B1
(45) Date of Patent: Oct. 18, 2022

(54) PARABOLIC LENS DEVICE FOR USE IN OPTICAL SUBASSEMBLY MODULES

(71) Applicant: Applied Optoelectronics, Inc., Sugar Land, TX (US)

(72) Inventors: Kai-Sheng Lin, Sugar Land, TX (US); Hao-Chiang Cheng, Houston, TX (US); Ziliang Cai, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 19 days.

(21) Appl. No.: 17/331,911

(22) Filed: May 27, 2021

(51) Int. Cl.
 *G02B 6/42* (2006.01)
 *H04J 14/02* (2006.01)
 *H04B 10/40* (2013.01)

(52) U.S. Cl.
 CPC ......... *G02B 6/4214* (2013.01); *G02B 6/4292* (2013.01); *H04B 10/40* (2013.01); *H04J 14/02* (2013.01)

(58) Field of Classification Search
 CPC .. G02B 6/2938; G02B 6/4246; G02B 6/4292; G02B 27/10; H04B 10/40; H04J 14/02
 See application file for complete search history.

(56) References Cited

U.S. PATENT DOCUMENTS

| | | | |
|---|---|---|---|
| 10,281,651 B2 * | 5/2019 | Matres | G02B 1/11 |
| 2016/0195677 A1 * | 7/2016 | Panotopoulos | G02B 6/4214 250/227.23 |
| 2019/0319733 A1 * | 10/2019 | Lipson | G02B 6/29364 |

* cited by examiner

*Primary Examiner* — Michael P Mooney
(74) *Attorney, Agent, or Firm* — Grossman Tucker Perreault & Pfleger, PLLC; Norman S. Kinsella

(57) ABSTRACT

A parabolic reflector device (also referred to herein as a parabolic lens device) is disclosed which includes a plurality of parabolic lens members and a mirror member which couple together and collectively provide a light-transmissive structure for multiplexing or demultiplexing of an optical signal. The parabolic reflector device can be implemented within optical subassembly modules to support operations of transmitter optical subassemblies (TOSAs) and/or receiver optical subassemblies (ROSAs).

22 Claims, 11 Drawing Sheets

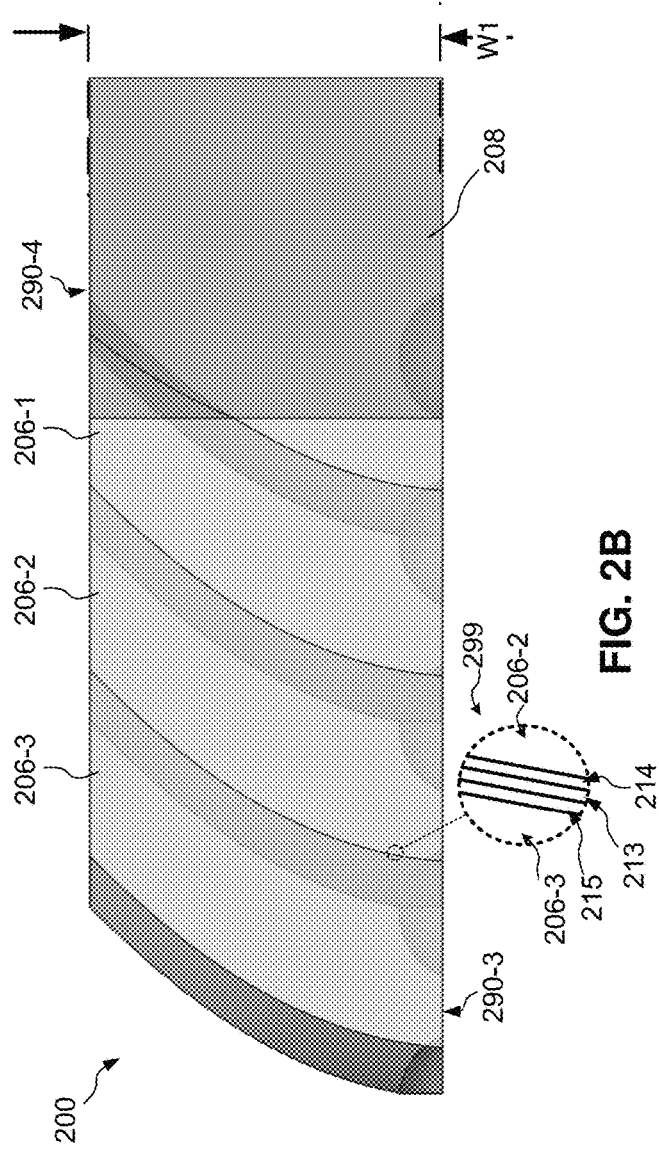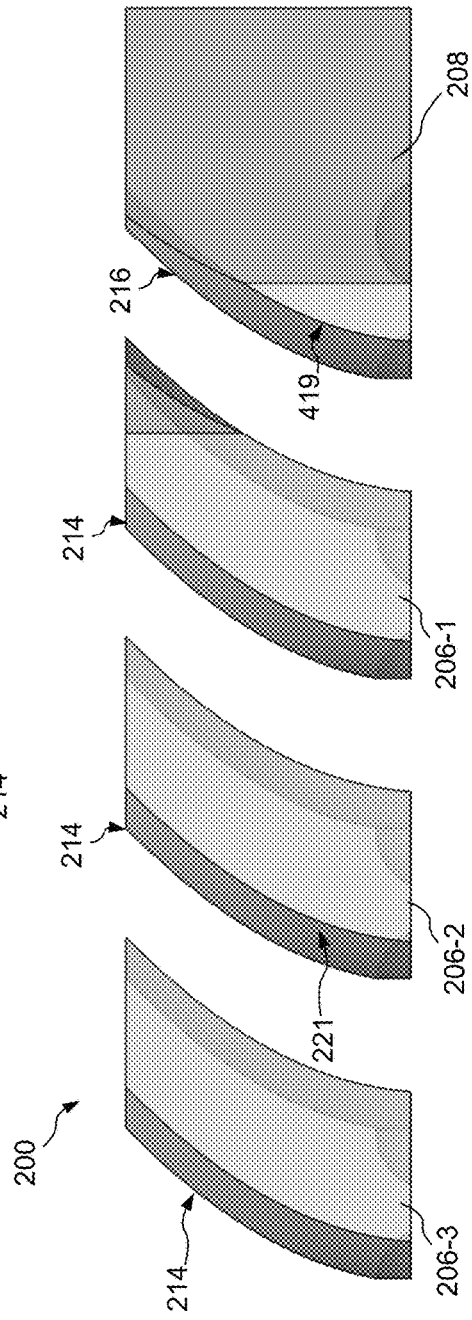

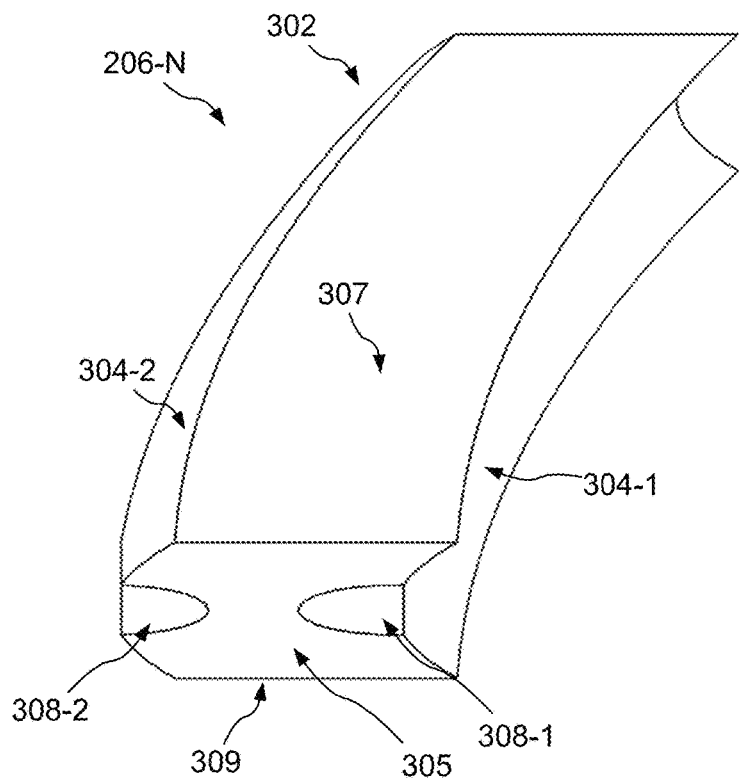
FIG. 3
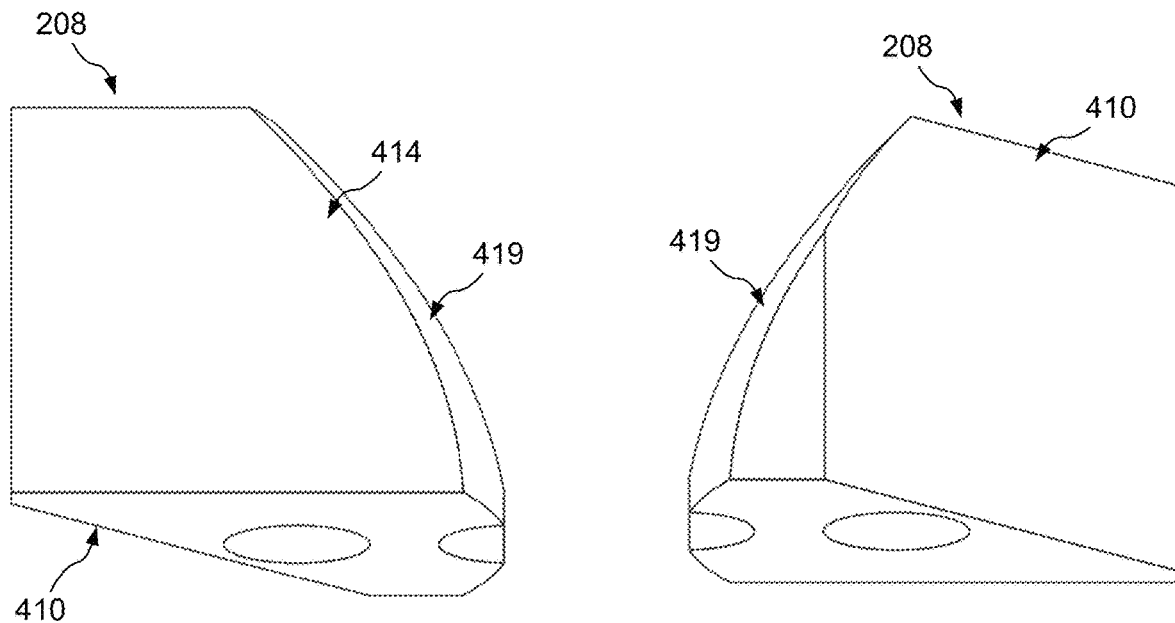
FIG. 4A
FIG. 4B

PARABOLIC LENS DEVICE FOR USE IN OPTICAL SUBASSEMBLY MODULES

TECHNICAL FIELD

The present disclosure generally relates to optical communications, and more particularly, to a parabolic lens device (also referred to herein as a parabolic reflector device) for multiplexing or demultiplexing a multi-channel optical signal within an optical subassembly module.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. Such TOSAs and ROSAs often utilize optical multiplexers and demultiplexers for the purpose of combining and separating optical channel wavelengths, respectively. For example, ROSAs and TOSAs can utilize an arrayed waveguide grating (AWG) for separating and combining channel wavelengths. However, such multiplexers/demultiplexers can introduce optical losses due to misalignments with associated optical components, e.g., laser diodes, photodiodes and optical coupling receptacles, and based on the overall length of optical paths/waveguides within the multiplexers/demultiplexers.

BRIEF DESCRIPTION OF THE DRAWINGS

These and other features and advantages will be better understood by reading the following detailed description, taken together with the drawings wherein:

FIG. 2B shows a top view of the parabolic reflector device of FIG. 2A, in accordance with aspects of the present disclosure.

FIG. 2C shows the parabolic reflector device of FIG. 2A partially exploded, in accordance with aspects of the present disclosure.

FIG. 3 shows a parabolic lens member of the parabolic reflector device of FIG. 2A in isolation, in accordance with aspects of the present disclosure.

FIG. 4A shows a perspective view of a mirror member of the parabolic reflector device of FIG. 2A in isolation, in accordance with aspects of the present disclosure.

FIG. 4B shows another perspective view of the mirror member of the parabolic reflector device of FIG. 2A in isolation, in accordance with aspects of the present disclosure.

DETAILED DESCRIPTION

Figure 1A:
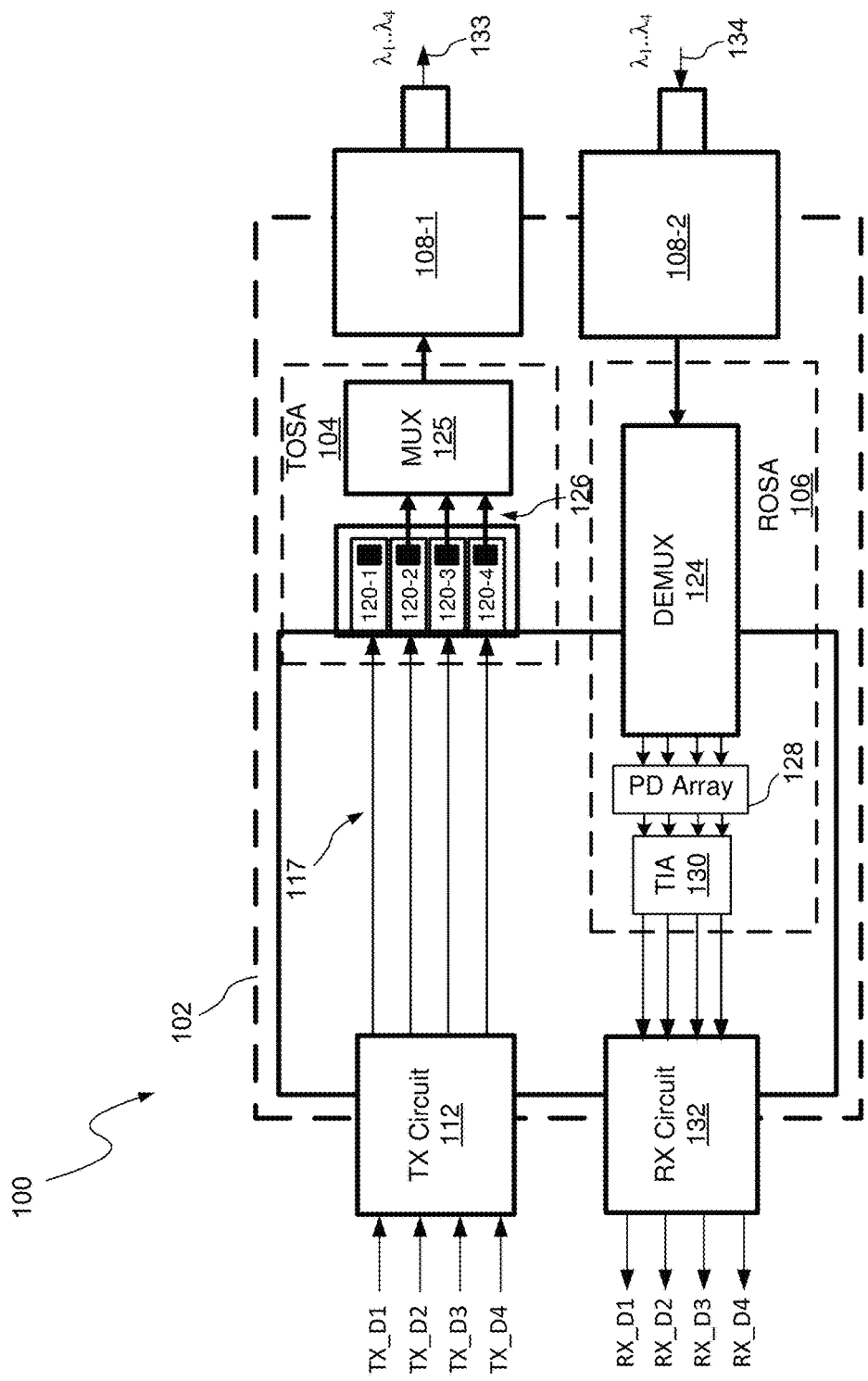
FIG. 1A shows an example optical transceiver system in accordance with aspects of the present disclosure.

In general, the present disclosure is directed to a parabolic reflector device (also referred to herein as a parabolic lens device) which includes a plurality of parabolic lens members and a mirror member which couple together and collectively provide a light-transmissive structure for multiplexing or demultiplexing of an optical signal. In more detail, each parabolic lens member preferably includes first and second parabolic surfaces which are disposed opposite each other and an optical coupling port. The optical coupling port preferably includes a spherical shape/profile and has a center that is aligned with a focus of the second parabolic surface. The second parabolic surface of each parabolic lens member is preferably configured as a short pass or long pass filter. The light-transmissive structure preferably defines a light path (also referred to herein as a common light path) that extends through each of the parabolic lens members, and more preferably, through the first and second parabolic surfaces of each of the parabolic lens members. In addition, the light path preferably intersects with an angled surface provided by the mirror member. The mirror member further preferably provides an optical coupling surface aligned with the angled surface for receiving into, or emitting therefrom, an optical signal from the light-transmissive structure.

When used for optical demultiplexing, the parabolic reflector device can receive a multiplexed optical signal via the optical coupling surface of the mirror member. The angled surface of the mirror member can then reflect the received multiplexed optical signal along the light path that extends through the parabolic lens members (e.g., based on Snell's Law). Each of the parabolic lens members can provide short or long pass filtering, as discussed above, such that each parabolic lens member reflects a target channel wavelength towards a corresponding optical coupling port and passes unassociated/other wavelengths along the light path. Thus, channel wavelengths traveling along the light path are separated by virtue of the long or short pass filtering provided by the plurality of parabolic lens members and output from the parabolic reflector device via a respective optical coupling port to, for example, a photodetector.

When used for optical multiplexing, each optical coupling port of the plurality of parabolic lens members is optically aligned with a laser diode such that channel wavelengths emitted by the same are passed into the light-transmissive structure. The parabolic lens members then provide short or long pass filtering such that channel wavelengths emitted from the laser diodes are reflected along the optical path and combined. Each parabolic lens device is preferably configured to provide such combining by reflecting incident channel wavelengths from an associated laser diode on to the light path while allowing incident channel wavelengths from unassociated laser diodes to pass, e.g., along the light path. The angled surface of the mirror member then redirects the combined channel wavelengths towards the optical coupling surface of the mirror member for output to, for instance, an external transmit optical fiber.

Thus, a parabolic reflector device consistent with the present disclosure can be utilized as an optical multiplexer or demultiplexer to support TOSA and ROSA operations, respectively. Accordingly, a multi-channel optical transceiver can utilize one or more parabolic reflector devices consistent with the present disclosure for purposes of supporting TOSA and/or ROSA operations.

Numerous advantages over existing multiplexing and demultiplexing devices will be apparent in view of this disclosure. For example, a parabolic reflector device consistent with the present disclosure can provide a relatively short, straight light path which reduces the optical losses relative to Z-block type devices which redirect light internally in a zig-zag pattern. In addition, a parabolic reflector device consistent with the present disclosure does not necessarily require the use of additional/separate optical devices for optical multiplexing/demultiplexing such as mirrors and filters which are generally utilized by filter-type multiplexers/demultiplexers, and lens devices which are generally utilized within AWG and planar lightwave circuit (PLC) type devices. Instead, a parabolic reflector device consistent with the present disclosure can advantageously utilize the parabolic surfaces provided by the parabolic lens members for focusing and redirection of laser light. In addition, the parabolic reflector device can utilize the spherical shape/profile of the optical coupling ports provided by each parabolic lens member for purposes of collimating/focusing light emitted therefrom. Thus, a parabolic reflector device consistent with the present disclosure can emit separated channel wavelengths (directly) on to an associated photodiode without the use of an intermediate focus lens (See e.g., FIGS. 10A-10B).

A reflector device consistent with the present disclosure can also include an overall footprint that is smaller than existing multiplexing and demultiplexing devices. For example, AWG devices function based on light diffraction and generally include an overall length which permits patterned waveguides to introduce target phase shifts of laser light for multiplexing and demultiplexing of optical signals. Existing AWGs therefore include a minimum length of about 10 mm, width of 5 mm, and height of 2 mm.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly coupled" or "directly optically coupled" as used herein refers any optical connection that allows light to be imparted from one element to another along a light path without bends/turns and without the use of an intermediate device such as an optical fiber.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

The term light-transmissive as used herein refers to a medium/material that permits at least 80% of incident light to travel/pass therethrough without being reflected, absorbed and/or scattered unless otherwise provided.

Turning to FIG. 1A, an optical transceiver system 100, consistent with aspects of the present disclosure is shown. As shown, the optical transceiver system 100 transmits and receives four (4) channels using four different channel wavelengths ($\lambda 1$, $\lambda 2$, $\lambda 3$, $\lambda 4$) and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver system 100 may also be capable of transmission distances of 2 km to at least about 10 km. The optical transceiver system 100 may be used, for example, in internet data center applications or fiber to the home (FTTH) applications.

Preferably, the optical transceiver system 100 includes a housing 102 configured as a small form-factor pluggable (SFFP) housing. As shown, optical transceiver system 100 includes a transmitter optical subassembly (TOSA) arrangement 104 disposed in the housing 102 having a plurality of laser arrangements 120-1, 120-2, 120-3 and 120-4 for transmitting optical signals on different channel wavelengths and a multi-channel receiver optical subassembly (ROSA) 106 disposed in the housing 102 for receiving optical signals having multiple different channel wavelengths. The multi-channel ROSA 106 may also be referred to herein as a ROSA arrangement. The TOSA arrangement 104 and the multi-channel ROSA 106 are preferably located within the housing 102.

As further shown, the optical transceiver system 100 includes a transmit connecting circuit 112 and a receive connecting circuit 132 that provide electrical connections to the TOSA arrangement 104 and the multi-channel ROSA 106, respectively, within the housing 102. The transmit connecting circuit 112 is electrically connected to the electronic components in each of the laser arrangements 120-1 to 120-4 and the receive connecting circuit 132 is electrically connected to the electronic components (e.g., photodiodes, TIA(s), etc.) in the multi-channel ROSA 106. The transmit connecting circuit 112 and the receive connecting circuit 132 may be flexible printed circuits (FPCs) including at least conductive paths to provide electrical connections and may also include additional circuitry. Preferably, the transmit and receive connecting circuits 112, 132 are implemented at least in part in on a printed circuit board.

The TOSA arrangement 104 preferably electrically couples to the transmit connecting circuit 112 via electrically conductive paths 117 and is configured to receive driving signals (e.g., TX_D1 to TX_D4) and launch channel wavelengths 126 on to fiber(s) of the external transmit optical fiber 133 via optical multiplexer 125 and the first optical coupling port 108-1. Preferably, the optical multiplexer 125 is implemented as a parabolic reflector device consistent with aspects of the present disclosure, as discussed further below.

Continuing on, the example multi-channel ROSA 106 shown in FIG. 1A includes an optical demultiplexer 124 optically coupled to the second optical coupling port 108-2 to receive an optical signal having a plurality of multiplexed channel wavelengths via the external receive optical fiber 134. An output of the optical demultiplexer 124 is optically coupled to a photodiode array 128. The multi-channel ROSA 106 also includes a transimpedance amplifier (TIA) 130 electrically connected to the photodiode array 128. The photodiode array 128 and the TIA 130 detect and convert optical signals received from the optical demultiplexer 124 into electrical data signals (RX_D1 to RX_D4) which are output via the receive connecting circuit 132. The optical demultiplexer 124 is preferably implemented as a parabolic reflector device consistent with the present disclosure, as discussed further below.

Figure 1B:
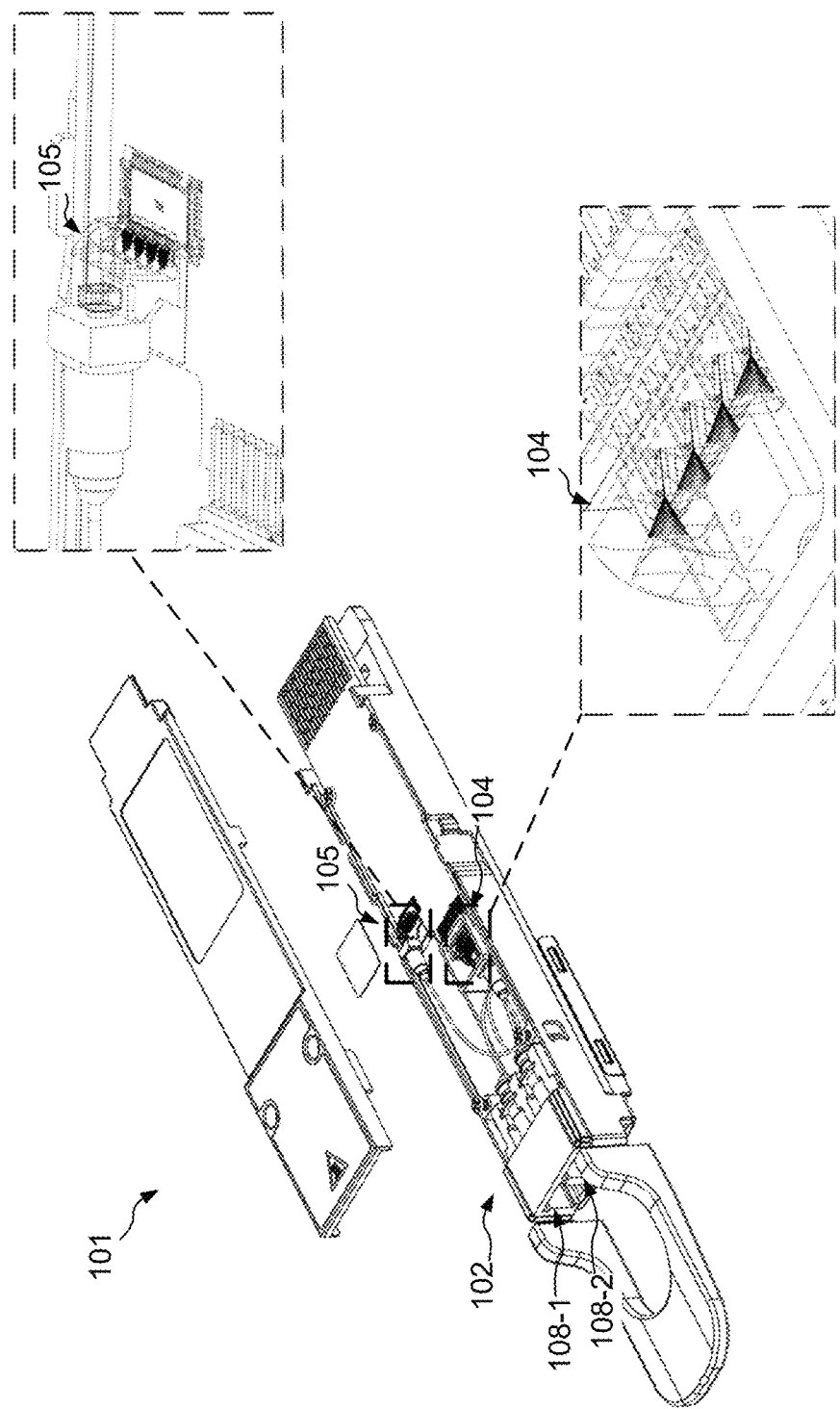
FIG. 1B shows an example optical transceiver module implementing the optical transceiver system of FIG. 1A, in accordance with aspects of the present disclosure.

FIG. 1B shows a partially exploded optical transceiver module 101 that preferably implements the optical transceiver system 100 of FIG. 1A. As shown, the optical transceiver module 101 preferably includes a housing 102 that is implemented as a small form-factor pluggable (SFFP) transceiver module. The optical transceiver module 101 may also be referred to herein as a multi-channel optical transceiver module.

As further shown, the TOSA arrangement 104 is preferably disposed in the housing 102. The TOSA arrangement 104 is preferably optically coupled to the first optical coupling port 108-1 to launch a multiplexed optical signal on to the external transmit optical fiber 133 (See FIG. 1A). More preferably, the TOSA arrangement 104 includes a plurality of laser arrangements and a parabolic reflector device consistent with the present disclosure that is configured to combine channel wavelengths emitted from the plurality of laser arrangements into the multiplexed optical signal, as discussed further below (See e.g., FIG. 12).

The ROSA arrangement 105 is also preferably disposed in the housing 102 of the optical transceiver module 101. The ROSA arrangement 105 is preferably optically coupled to the second optical coupling port 108-2 to receive a multiplexed optical signal, e.g., from external receive optical fiber 134. More preferably, the ROSA arrangement 105 includes a parabolic reflector device consistent with the present disclosure that is configured to demultiplex the received multiplexed optical signal into constituent channel wavelengths and provide the same to photodetectors, e.g., PDs of the PD array 128 (See FIG. 1A), as discussed further below (See e.g., FIGS. 10A-10B).

Figure 2A:
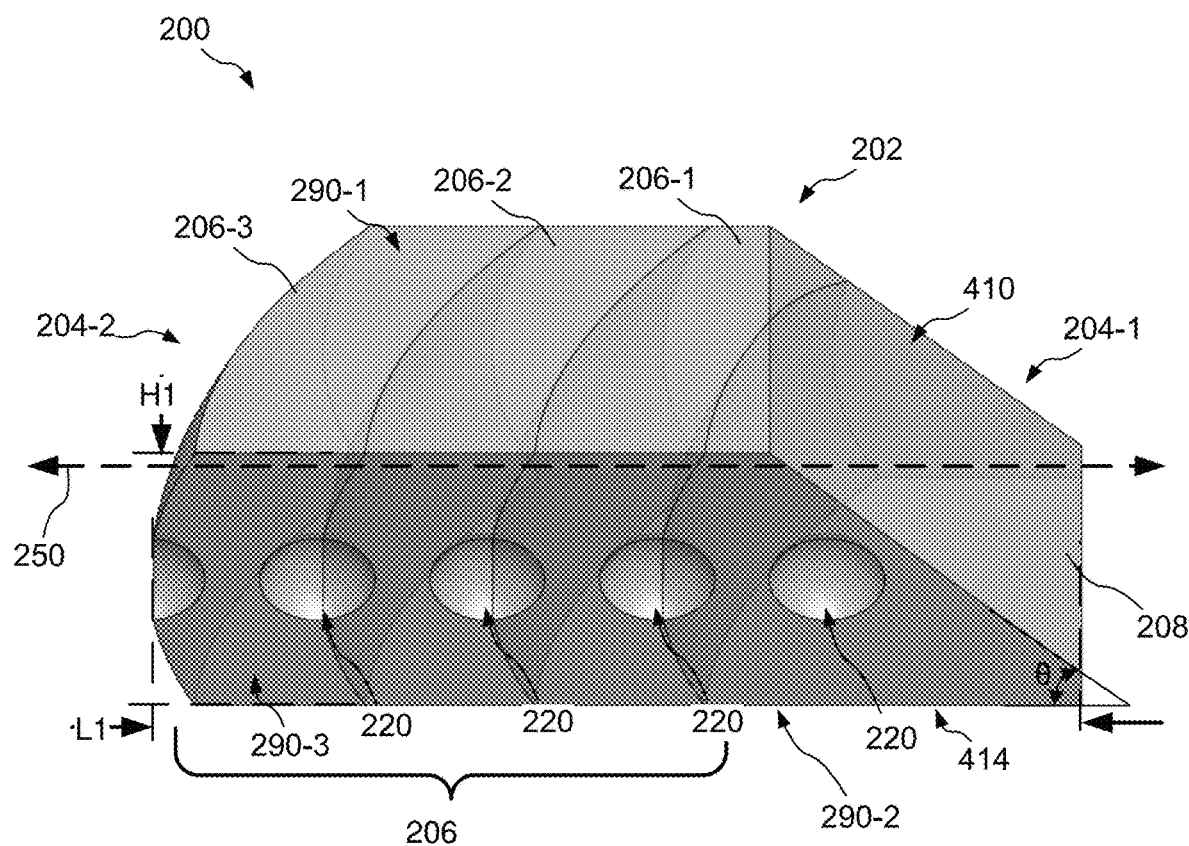
FIG. 2A shows an example parabolic reflector device suitable for use in the optical transceiver module of FIG. 1B, in accordance with aspects of the present disclosure.

Referring to FIGS. 2A-2C, a parabolic reflector device 200 for use within an optical subassembly is shown in accordance with aspects of the present disclosure. The parabolic reflector device 200 may also be referred to herein as a parabolic lens device. The parabolic reflector device 200 can be used within a TOSA arrangement, such as TOSA arrangement 104 (See FIG. 1A)

As shown, the parabolic reflector device 200 is preferably defined by a light-transmissive structure 202 that extends from a first end 204-1 to a second end 204-2 along longitudinal axis 250. The light-transmissive structure 202 is preferably collectively provided by a plurality of light-transmissive members which couple (directly) together via parabolic mating surfaces, as discussed further below. The light-transmissive members may also be referred to herein as parabolic light-transmissive members. The light-transmissive structure 202 can be utilized to multiplex or demultiplex optical signals, as will be discussed in further detail below.

The overall length L1 of the parabolic reflector device 200 is preferably within a range of 3 to 5 mm, and more preferably 4±0.5 mm. The overall height H1 of the parabolic reflector device 200 is preferably within a range of 1 to 2 mm, and more preferably 1.5±0.5 mm. The overall width W1 (See FIG. 2B) of the parabolic reflector device 200 is preferably within a range of 1 to 2 mm, and more preferably 1.5±0.5 mm.

In the preferred example of FIG. 2A, the plurality of light-transmissive members forming the light-transmissive structure 202 include a mirror member 208 and a plurality of parabolic lens members shown collectively at 206 and individually as a first parabolic lens member 206-1, a second parabolic lens member 206-2, and a third parabolic lens member 206-3. Note, the particular number of parabolic lens members shown in FIG. 2A is not intended to be limiting and a parabolic reflector device consistent with the present disclosure can include more or fewer parabolic lens members. Preferably, the total number of light-transmissive members providing the light-transmissive structure 202 is equal to the target channel count. For example, the parabolic reflector device 200 of FIG. 2A includes four (4) light-transmissive members (i.e., three (3) parabolic lens members and a mirror member), and can provide multiplexing or demultiplexing of four (4) different channel wavelengths.

The mirror member 208 may also be referred to herein as a turning mirror. The mirror member 208 preferably defines the first end 204-1 and the plurality of parabolic lens members 206 preferably define the second end 204-2 when coupled to the mirror member 208. The plurality of light-transmissive members further preferably couple to each other in a stack configuration, such as shown in FIG. 2A, such that each of the light-transmissive members are disposed along the longitudinal axis 250 and couple together to form the light-transmissive structure 202. More preferably, the plurality of light-transmissive members directly couple to each other in the stack configuration. An imaginary center line extending through the light-transmissive structure 202, e.g., in parallel with the longitudinal axis 250, preferably intersects with each of the light-transmissive members, and more preferably, with a center of each of the light-transmissive members.

As further shown, the light-transmissive structure 202 defines at least one outer surface when the light-transmissive members are coupled to each other. As discussed further below, the at least one outer surface preferably defines a plurality of optical coupling ports. Further, the at least one outer surface is preferably configured to allow for mounting of the light-transmissive structure 202 within an optical subassembly, e.g., via a submount (See e.g., FIG. 10A).

As shown, the example of FIG. 2A includes a plurality of outer surfaces, and namely a first planar surface 290-1 and a second planar surface 290-2, with the first and second planar surfaces 290-1, 290-2 being disposed opposite each other. Preferably, the first planar surface 290-1 extends from the first end 204-1 to the second end 204-2 of the light-transmissive structure 202. Likewise, the second planar surface 290-2 preferably extends from the first end 204-1 to the second end 204-2 of the light-transmissive structure 202. The first and second planar surfaces 290-1, 290-2 can extend substantially in parallel with each other and substantially in parallel with the longitudinal axis 250. However, the first and second planar surfaces 290-1, 290-2 are not necessarily limited in this regard and may not necessarily extend in a parallel relationship with the longitudinal axis and/or with each other.

As further shown, the light-transmissive structure 202 can also define third and fourth planar surfaces 290-3, 290-4 when the light-transmissive members are coupled to each other. The third and fourth planar surfaces 290-3, 290-4 preferably adjoin the first and second planar surfaces 290-1, 290-2 to each other. As discussed further below, the third planar surface 290-3 can define a plurality of optical coupling ports for receiving or emitting channel wavelengths. Preferably, the third and fourth planar surfaces 290-3, 290-4 extend substantially in parallel with each other.

Preferably, each parabolic lens member of the plurality of parabolic lens members 206 comprises a material such as glass, silica, or silicon. More preferably, each parabolic lens member of the plurality of parabolic lens members 206 comprises the same material (or a material with a substantially similar index of refraction) to ensure that each parabolic lens member has a matching, or substantially matching, index of refraction. Likewise, the mirror member 208 also preferably comprises the same material as the plurality of parabolic lens members 206, although this disclosure is not necessarily limited in this regard.

Each parabolic lens member of the plurality parabolic lens members 206 further preferably includes a light-transmissive body that defines first and second parabolic surfaces. For example, an example parabolic lens member 206-N is shown in FIG. 3 that can be implemented as any one of the plurality of parabolic lens members 206. As shown, the parabolic lens member 206-N includes a light-transmissive body 302. The light-transmissive body 302 preferably defines a first parabolic surface 304-1 disposed opposite a second parabolic surface 304-2.

The first parabolic surface 304-1 is preferably defined by a recess that extends into the light-transmissive body 302 such that the first parabolic surface 304-1 has a concave profile. Accordingly, the first parabolic surface 304-1 may also be referred to herein as a concave lens surface. The first parabolic surface 304-1 preferably includes an antireflective (AR) layer disposed thereon.

On the other hand, the second parabolic surface 304-2 is preferably convex and extends outwards/away from the light-transmissive body 302. The second parabolic surface 304-2 may also be referred to herein as a convex lens surface. The second parabolic surface 304-2 further preferably includes a coating disposed thereon to provide long pass or short pass filtering based on an associated channel wavelength, as discussed further below.

The first parabolic surface 304-1 preferably extends substantially in parallel with the second parabolic surface 304-2. Further, the first and second parabolic surfaces 304-1, 304-2 preferably extend longitudinally along the light-transmissive body 302. Each end of the light-transmissive body 302 preferably provides a distal surface, such as distal surface 305, that adjoins the first and second parabolic surfaces 304-1, 304-2. Each distal surface is preferably substantially planar/flat and provide a portion of the third and fourth planar surfaces 290-3, 290-4 of the light-transmissive structure 202 discussed above. Further, the light-transmissive body 302 further preferably defines at least one substantially flat/planar surface that adjoins the distal surfaces. For example, and as shown in FIG. 3, the light-transmissive body 302 includes top and bottom surfaces 307 and 309, respectively. The top and bottom surfaces 307 and 309 are preferably substantially planar/flat and provide at least a portion of the first and second planar surfaces 290-1, 290-2 of the light-transmissive structure 202 discussed above.

The parabolic lens member 206-N further preferably includes an optical coating layer disposed on the second parabolic surface 304-2. For example, and as shown more clearly in FIGS. 2B-2C, the second parabolic surface of each of the first, second and third parabolic lens members can include an optical coating layer 214 disposed thereon. The optical coating layer 214 is preferably configured to provide to provide long-pass and/or short-pass filtering of channel wavelengths, as is discussed in further detail below.

Continuing with FIG. 2C, the first parabolic surface 304-1 of the parabolic lens member 206-N is configured for coupling/mating with an adjacent parabolic lens member, and more preferably, a second (convex) parabolic surface of the adjacent parabolic lens member. Thus, parabolic lens members can be coupled together based on respective first and second parabolic surfaces and form an interface therebetween. More preferably, the interface between each light-transmissive member of the light-transmissive structure 202 is collectively provided by an optical coating layer, e.g., optical coating layer 214/216, and an AR layer. In some scenarios, the interface may also be formed based at least in part by an index matching glue which can advantageously reduce optical power loss, as discussed further below.

One such example interface 299 including a layer of index matching glue 213 is shown more clearly in FIG. 2B. In this example, the interface 299 between each light-transmissive member of the parabolic reflector device 200 preferably includes an optical coating layer 214, a layer of index matching glue 213, and AR layer 215. Note, the interface between the mirror member 208 and the first parabolic lens member 206-1 can include the same interface configuration as the interface 299 or a different configuration depending on a desired application.

As further shown in FIG. 3, the parabolic lens member 206-N further preferably includes a first recessed surface 308-1 at a distal end of the light-transmissive body 302 adjacent the first parabolic surface 304-1, and a second recessed surface 308-2 disposed on a distal end of the light-transmissive body 302 adjacent the second parabolic surface 304-2. Preferably, the first and second recessed surfaces 308-1, 308-2 are disposed at the same distal end of the light-transmissive body 302. The first and second recessed surfaces 308-1, 308-2 preferably include a rounded/spherical profile. The first and second recessed surfaces 308-1, 308-2 are further preferably configured to form optical coupling ports when, for example, the parabolic lens member 206-N is coupled to adjacent parabolic lens members. The first and second recessed surfaces 308-1, 308-2 are preferably formed/integrated with the light-transmissive body, e.g., as a single, monolithic piece, or can be introduced through post-processing of the light-transmissive body 302, e.g., through cutting and/or polishing processes.

For example, and as shown more clearly in FIG. 2A, each of the plurality of parabolic lens members 206 are configured to form a plurality of optical coupling ports 220 when coupled to each other. Thus, each optical coupling port 220 of the plurality of optical coupling ports 220 is preferably collectively defined by at least two adjacent parabolic lens members. Preferably, the plurality of optical coupling ports 220 are defined along the same side of the light-transmissive structure 202.

Turning to FIGS. 4A-4B, with additional reference to FIG. 2A, the mirror member 208 is shown in isolation in accordance with aspects of the present disclosure. As shown, the mirror member 208 preferably includes a light-transmissive body that defines an angled surface 410, an optical coupling surface 414, and a parabolic surface 419. The angled surface 410 preferably extends at a first angle $\theta$ relative to an optical coupling surface 414. Preferably, the first angle $\theta$ is in a range of 35-60 degrees, and more preferably, 45±10 degrees. The angled surface 410 may also be referred to herein as an angled reflective surface.

The optical coupling surface 414 may also be referred to herein as an optical input surface or simply an input. The optical coupling surface 414 can be utilized for receiving a multiplexed optical signal into the light-transmissive structure 202 for demultiplexing purposes, as is discussed in further detail below. As is more clearly shown in FIG. 2C, the mirror member 208 also preferably includes an optical coating layer 216 disposed on the parabolic surface 419. The optical coating layer 216 can be substantially similar to the optical coating layer 214, and can be utilized to provide short or long pass optical filtering as discussed in further detail below. The parabolic surface 419 is preferably configured to couple to an adjacent parabolic lens member. Thus, the parabolic surface 419 may also be referred to herein as a parabolic mating surface.

Figure 5A:
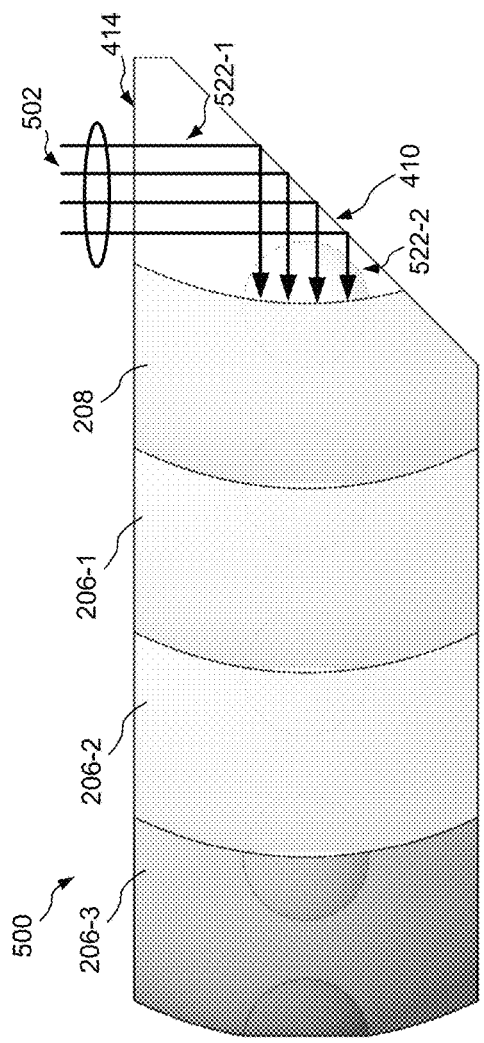
FIG. 5A shows a side view of an example parabolic reflector device consistent with the present disclosure implemented as an optical demultiplexer.
Figure 5B:
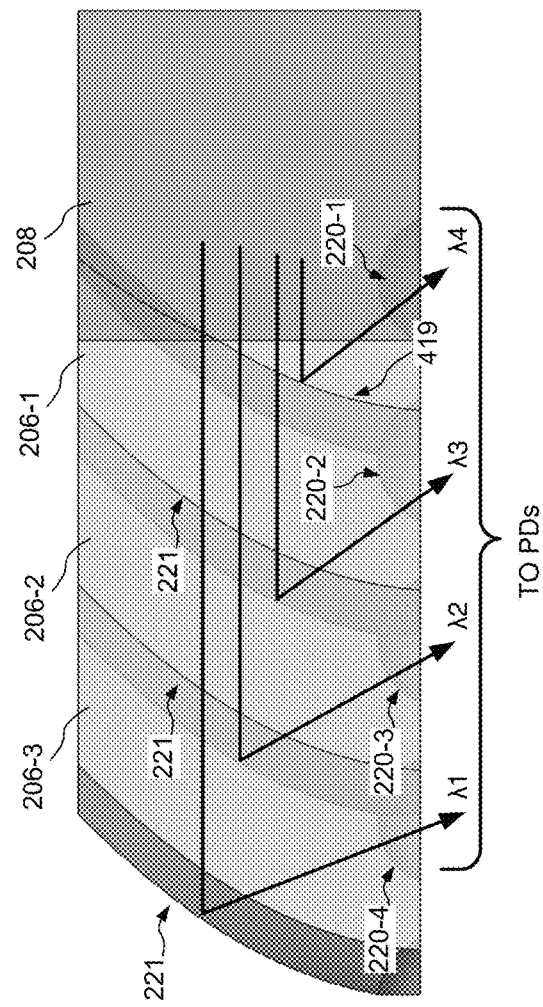
FIG. 5B shows a top view of the example reflector device of FIG. 5A, in accordance with aspects of the present disclosure.

FIGS. 5A-5B show an example parabolic reflector device 500 configured as an optical demultiplexer. The parabolic reflector device 500 can be configured substantially similar to the parabolic reflector device 200 of FIGS. 2A-2C, the description and features of which are equally applicable to the parabolic reflector device 500 and will not be repeated for brevity. As shown, a multiplexed optical signal 502 is launched into the light transmissive body of the parabolic reflector device 200 by way of optical coupling surface 414 provided by the mirror member 208. For example, the multiplexed optical signal 502 can include a wavelength division multiplexed signal having a plurality of different channel wavelengths.

The optical coupling surface 414 is preferably configured to pass at least 80%, and more preferably at least 85-99%, of incident wavelengths received at normal (e.g., perpendicular to the optical coupling surface) into the light-transmissive structure of the parabolic reflector device 500. The multiplexed optical signal 502 then travels along a first light path 522-1 that intersects with the angled surface 410. Based on the index of refraction for the mirror member 208 relative to the surrounding medium, e.g., air, the incident channel wavelengths of the multiplexed optical signal 502 are then reflected via the angled surface 410 along a second light path 522-2 (or common light path) that extends substantially transverse relative to the first light path 522-1 based on Snell's law. The channel wavelengths traveling along the second light path 522-2 then intersect with the parabolic surface 419 of the mirror member 208.

The parabolic surface 419 can be configured to provide a long pass or short pass optical filter, e.g., based on optical coating layer 216 (See FIG. 2C). As shown in the example of FIG. 5B, the parabolic surface 419 provides a short pass filter which is configured to pass channel wavelengths which are less than channel wavelength $\lambda 4$, for instance, and reflect channel wavelengths greater than or equal to channel wavelength $\lambda 4$. Accordingly, passed channel wavelengths continue along the second light path 522-2 towards the first, second and third parabolic lens members 206-1, 206-2, and 206-3. Preferably, the first, second and third parabolic lens members 206-1, 206-2, and 206-3, respectively, are configured as a short pass or long pass optical filter based on each optical coating layer 214. As shown in the example of FIG. 5B, for example, each parabolic lens member is configured as a short pass filter such that the first parabolic lens member 206-1 is configured to pass channel wavelengths less than channel wavelength $\lambda 3$ and reflect channel wavelengths equal to or greater than channel wavelength $\lambda 3$; the second parabolic lens member 206-2 is configured to pass channel wavelengths less than channel wavelength $\lambda 2$ and reflect channel wavelengths equal to or greater than channel wavelength $\lambda 2$, and the third parabolic lens member 206-3 is configured to pass channel wavelengths less than channel wavelength $\lambda 1$ and reflect channel wavelengths equal to or greater than channel wavelength $\lambda 1$. It should be noted in this scenario that channel wavelength $\lambda 4 > \lambda 3 > \lambda 2 > \lambda 1$.

Each of the parabolic lens members preferably include a respective second parabolic surface, e.g., second parabolic surface 221 (See e.g., FIG. 2C), having a focus through which the second light path 522-2 extends. The focus of each parabolic lens surface is further preferably configured to optically align with a respective optical coupling port. Thus, each respective optical coupling port preferably includes a center which is optically aligned with the focus of a corresponding second parabolic surface, as discussed further below.

Figure 10A:
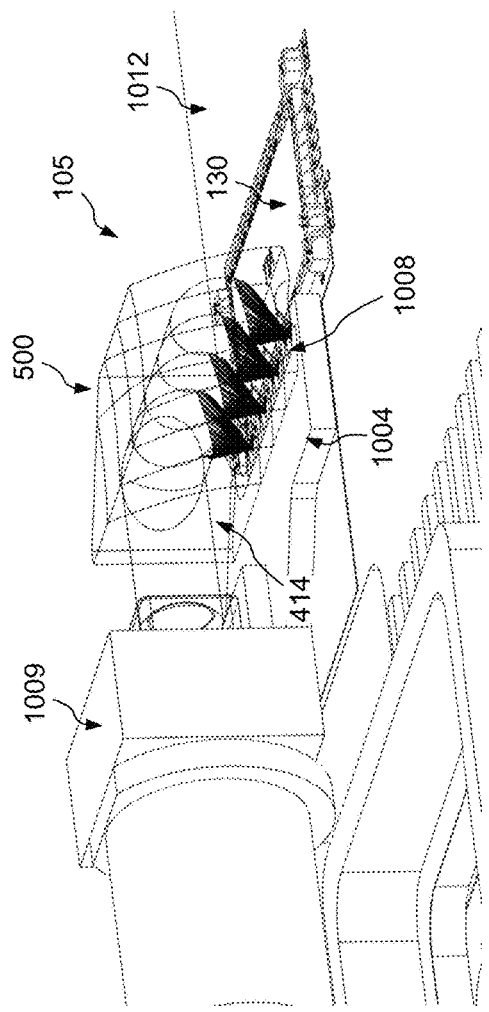
FIG. 10A shows an enlarged region of the optical transceiver module of FIG. 1B that includes a multi-channel receiver subassembly (ROSA) arrangement implementing a parabolic reflector device consistent with the present disclosure as an optical demultiplexer.
Figure 10B:
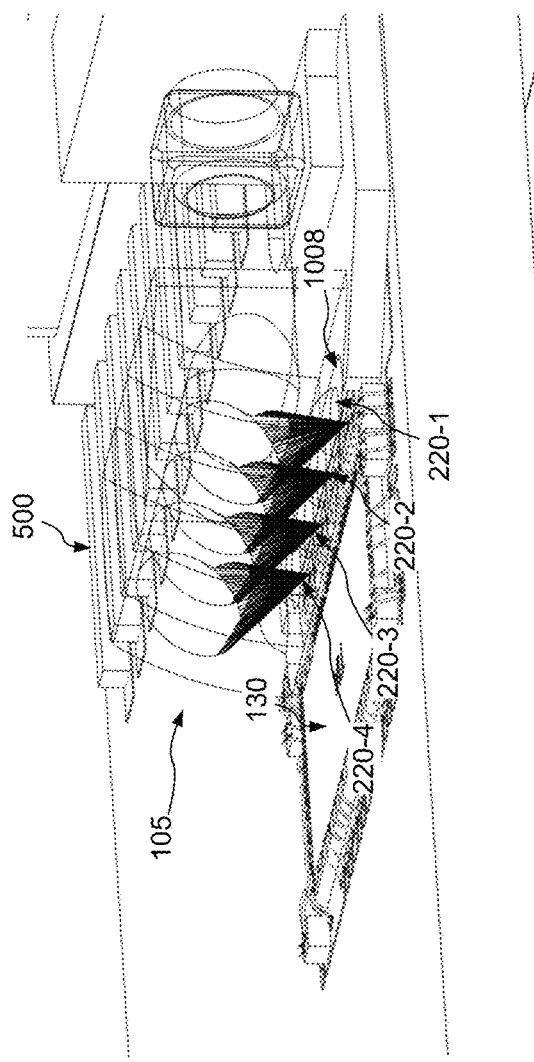
FIG. 10B shows another view of the ROSA arrangement of FIG. 10A.

Thus in operation, the mirror member 208 is configured to output an optical signal having the fourth channel wavelength $\lambda 4$ via the first optical coupling port 220-1; the first parabolic lens member 206-1 is configured to output an optical signal having the third channel wavelength $\lambda 3$ via the second optical coupling port 220-2; the second parabolic lens member 206-2 is configured to output an optical signal having the second channel wavelength $\lambda 2$ via the third optical coupling port 220-3; and the third parabolic lens member 206-3 is configured to output an optical signal having the first channel wavelength $\lambda 1$ via the fourth optical coupling port 220-4. Preferably, each optical coupling port emits respective channel wavelengths towards a respective PD of a PD array, such as is shown in FIGS. 10A-10B and discussed further below.

Figure 6:
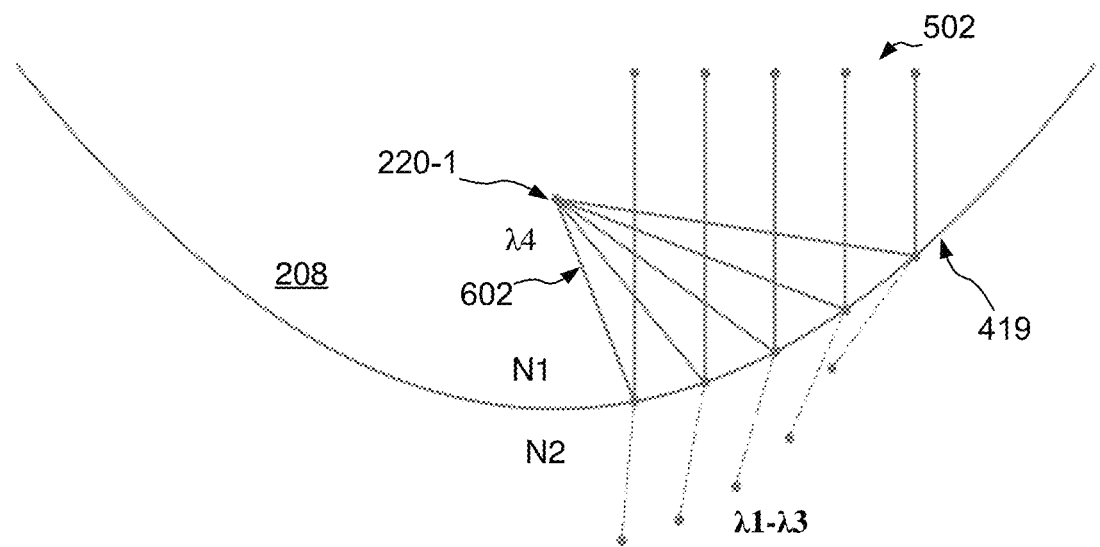
FIG. 6 shows a cross-sectional view of a parabolic lens member in accordance with aspects of the present disclosure.

FIG. 6 shows an example cross-sectional view of the mirror member 208 and how the parabolic surface 419 is configured to reflect and emit a target channel wavelength, e.g., $\lambda 4$, and pass other, unassociated channel wavelengths, e.g., $\lambda 1$-$\lambda 3$. As shown, the mirror member 208 can include a first index of refraction, e.g., 1.5, and the medium surrounding the mirror member 208 includes a second index of refraction, e.g., 1. Based on Snell's law, this difference between the respective index of refraction can be utilized to reflect the target channel wavelengths back into the mirror member 208, and more preferably, towards the center of the optical coupling port 220-1 (See also FIG. 5B). Preferably, the parabolic surface 419 is angled relative to the second light path 522-2 along which the multiplexed optical signal 502 travels (See FIGS. 5A-5B) such that total internal reflection occurs. However, the parabolic surface is preferably configured as a short pass or long pass filter (e.g., based on optical coating layer 216 as shown in FIG. 2C) such that internal reflection occurs for the target/associated channel wavelength, e.g., λ4, while also allowing for the other non-associated channel wavelengths (e.g., channel wavelengths λ1-λ3) to pass from the mirror member 208. Based on the parabolic surface 419, this also further preferably causes the reflected light having the target channel wavelength to be collimated/focused such that the cone 602 includes a focus at, or in close proximity of, the center of the optical coupling port 220-1.

Figure 7:
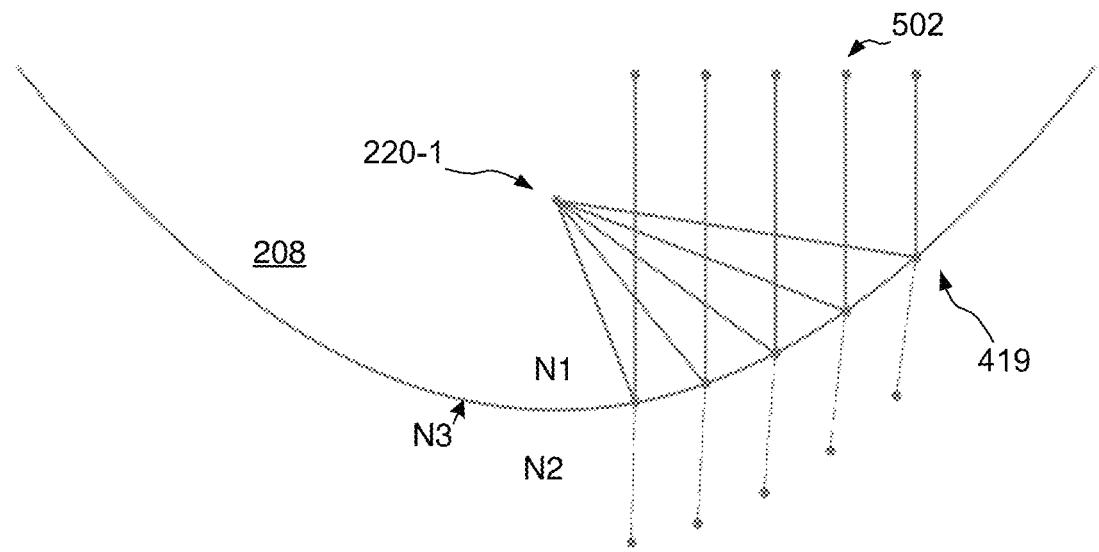
FIG. 7 shows another cross-sectional view of a parabolic lens member in accordance with aspects of the present disclosure.

Note, the parabolic surface 419 can be coated or otherwise modified to cause light emitted by the parabolic surface 419 to be output along a relatively straight light path to reduce optical losses between lens members of a parabolic reflector device consistent with the present disclosure. One example is shown in FIG. 7 and includes disposing an index matching glue on to the parabolic surface 419, with the index matching glue having a third index of refraction N3 equal to 1.3, for example. In this example, the difference between the first index of refraction N1 for the mirror member 208, the second index of refraction N2 for the medium surrounding the mirror member 208, and the third index of refraction N3 for the index matching glue can be utilized to form an output interface therebetween that causes the emitted light to be output along a substantially straight optical/light path. Stated differently, index matching glue/coatings may be utilized to ensure that the parabolic surface 419 emits channel wavelengths in a manner that minimizes or otherwise reduces scattering, and thus by extension, reduces power loss as optical signals are passed through the parabolic reflector device along the second light path 522-2 (See FIG. 5A). Note, index matching glue can be disposed at an interface between each parabolic lens member of a reflector device consistent with the present disclosure to further reduce optical power loss.

Figure 8:
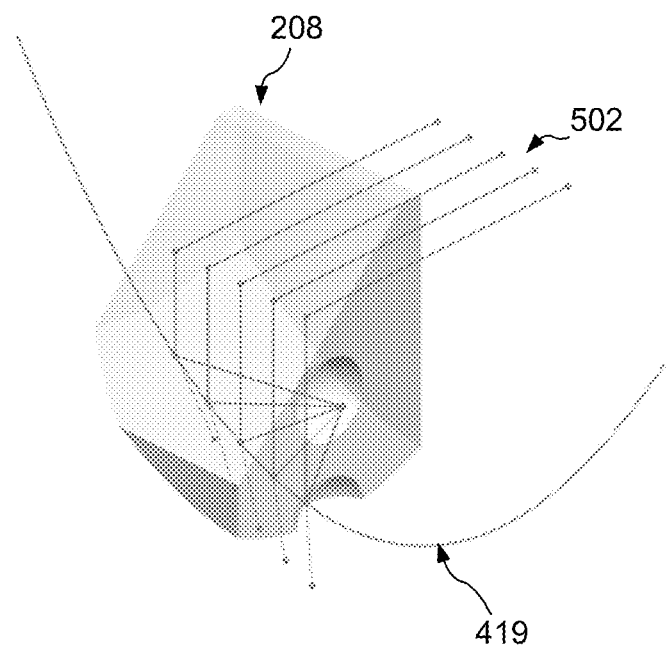
FIG. 8 shows one example optical path for light traveling through a mirror member consistent with the present disclosure.
Figure 9:
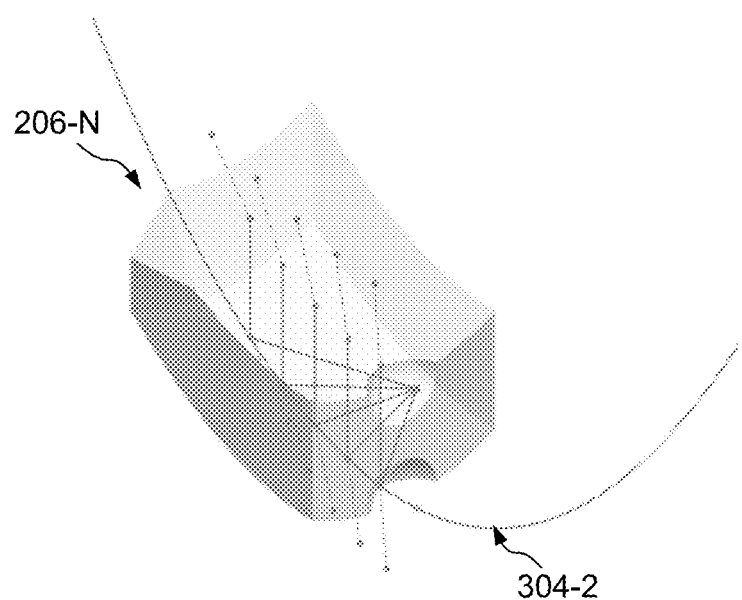
FIG. 9 shows another example light path for light traveling through a parabolic lens member consistent with the present disclosure.

FIG. 8 shows another example of how the parabolic surface 419 of the mirror member 208 passes and reflects channel wavelengths of the multiplexed optical signal 502 as discussed above. Likewise, FIG. 9 shows how the parabolic lens member 206-N can include a substantially similar configuration and utilize the second parabolic surface 304-2 to pass and reflect channel wavelengths of the multiplexed optical signal 502, the features and examples of which are equally applicable to the parabolic lens member 206-N and will not be repeated for brevity.

FIGS. 10A-10B show the example parabolic reflector device 500 of FIGS. 5A-5B implemented as the optical demultiplexer 124 within the ROSA arrangement 105 of the optical transceiver module 101 shown in FIG. 1B. As shown, the ROSA arrangement 105 includes the parabolic reflector device 500 mounted to a substrate 1012 of the ROSA arrangement 105 by way of submount 1004. In this example, the surface defining the optical coupling ports 220-1 to 220-4 is utilized to mount the parabolic reflector device 500 to the submount 1004.

The parabolic reflector device 500 further includes the optical coupling surface 414 optically aligned with optical coupling port 1009 to receive a multiplexed optical signal. The parabolic reflector device 500 further includes each of the optical coupling ports 220-1 to 220-4 optically aligned with respective ones of a plurality of photodiodes 1008. The plurality of photodiodes 1008 are preferably electrically coupled to the TIA 130 for purposes of amplifying detected channel wavelengths for output purposes, e.g., via receive connecting circuit 132 (See FIG. 1A).

Figure 11:
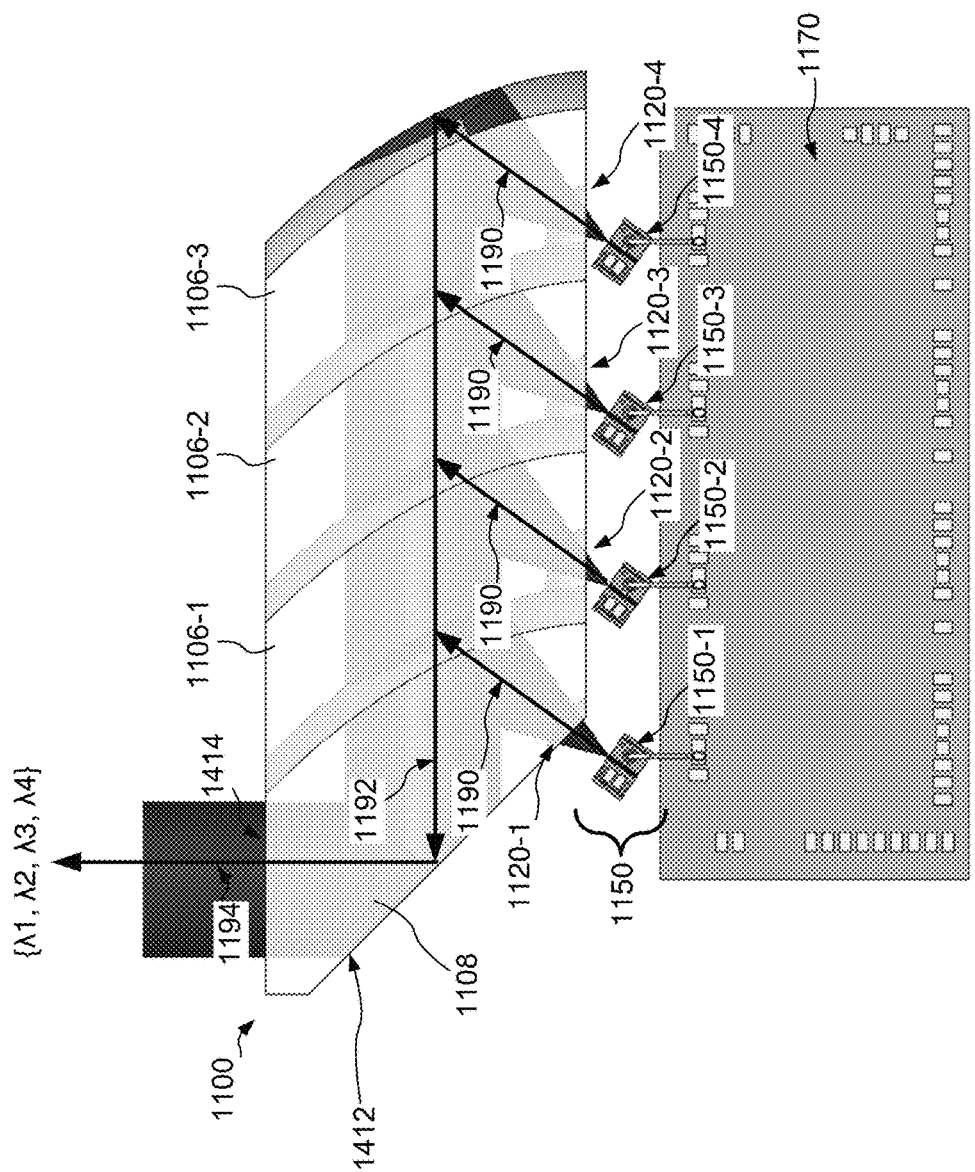
FIG. 11 shows a top-view of an example parabolic reflector device implemented as an optical multiplexer within a transmitter optical subassembly (TOSA) arrangement.

FIG. 11 shows another example of a parabolic reflector device 1100 consistent with the present disclosure configured as an optical multiplexer for use within the TOSA arrangement 104 (See FIG. 1A). The parabolic reflector device 1100 can be configured substantially similar to that of the parabolic reflector device 200 as discussed above with regard to FIGS. 2A-2C, the features and description of which are equally applicable to the parabolic reflector device 1100 and will not be repeated for brevity.

As shown, the parabolic reflector device 1100 includes a mirror member 1108 that defines a first optical coupling port 1120-1, a first parabolic lens member 1106-1 that defines a second optical coupling port 1120-2, and second parabolic lens member 1106-2 that defines a third optical coupling port 1120-3, and a third parabolic lens member 1106-3 that defines a fourth optical coupling port 1120-4.

The example of FIG. 11 further includes a plurality of laser diodes shown collectively at 1150 and individually as a first laser diode 1150-1, a second laser diode 1150-2, a third laser diode 1150-3, and a fourth laser diode 1150-4. A laser diode driver LDD 1170 is electrically coupled to each of the plurality of laser diodes to provide a driving signal, for example. The plurality of laser diodes can be implemented to provide, for example, the plurality of laser arrangements 120-1 to 120-4 as discussed above with regard to FIG. 1A.

Each of the plurality of laser diodes is configured to emit laser light into a respective one of the optical coupling ports 1120-1 to 1120-4 along a plurality of first light paths 1190. Each of the plurality of first light paths 1190 preferably extend parallel with each other and at an angle relative to a second light path 1192 (or common light path). Each of the plurality of first light paths 1190 also further preferably intersect with a corresponding parabolic surface of the parabolic reflector device 1100 as shown.

In the preferred example of FIG. 11, this includes each of the plurality of laser diodes configured to emit a respective one of channel wavelengths λ1 to λ4. As further shown, each of the plurality of parabolic lens members include a second parabolic surface that is preferably configured to reflect incident channel wavelengths received along one of the corresponding plurality of first light paths 1190, and pass incident channel wavelengths received along the second light path 1192. As discussed above, each of the parabolic surfaces can be configured as a short pass or long pass filter via an optical coating layer, e.g., optical coating layer 214/216 (See FIG. 2C), to achieve this optical filtering and combining within the parabolic reflector device 1100. Accordingly, the different channel wavelengths from the plurality of laser diodes 1150 are combined along the second light path 1192. The second light path 1192 preferably extends substantially transverse relative to the plurality of first light paths 1190.

As further shown, the mirror member 1108 includes an angled surface 1412 at an end of the parabolic reflector device 1100. The second light path 1192 is preferably configured to intersect with the angled surface 1412 such that channel wavelengths launched and combined along the second light path 1192 get reflected/turned along a third light path 1194. The third light path 1194 preferably extends substantially transverse relative to the second light path 1192. The third light path 1194 is further preferably configured to launch the combined channel wavelengths on to an external transmit optical fiber, e.g., the external transmit optical fiber 133 (See FIG. 1A).

Notably, and as discussed above, an index matching interface can be formed between adjacent parabolic lens members and/or the mirror member, e.g., based on an index matching glue, to reduce optical losses along the second light path 1192.

Figure 12:
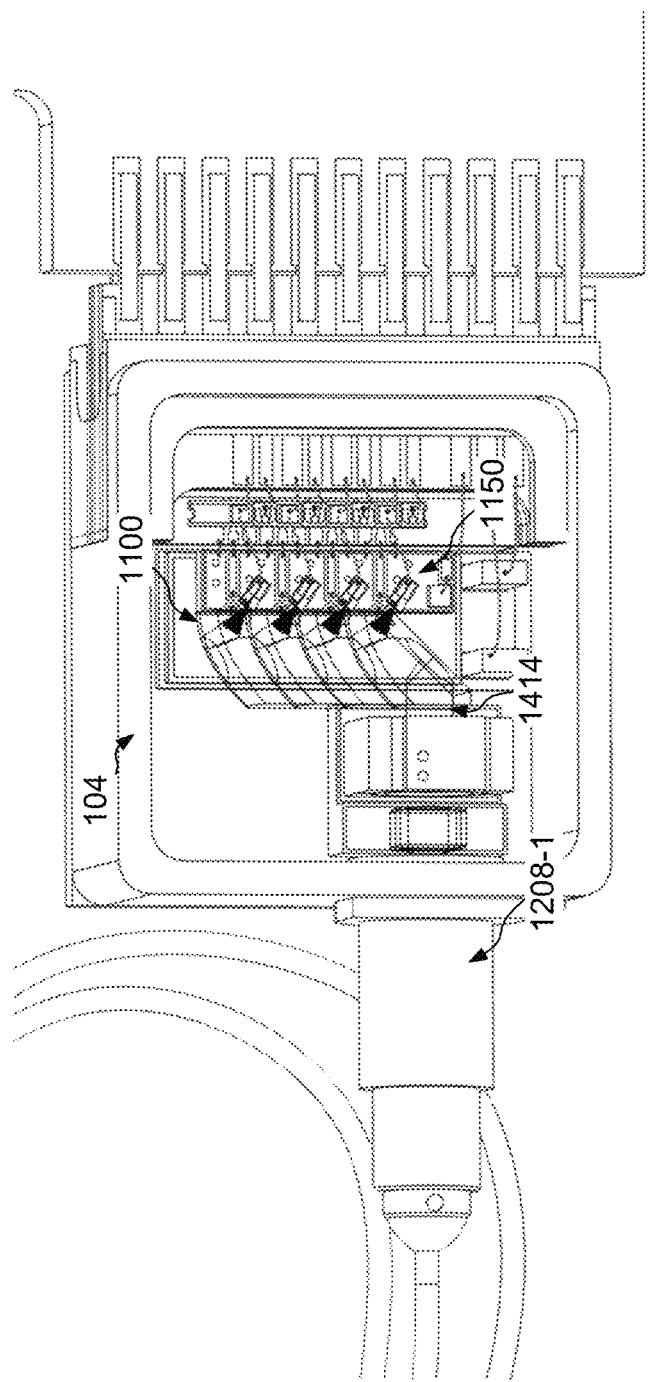
FIG. 12 shows an enlarged region of the optical transceiver module of FIG. 1B that includes a multi-channel transceiver subassembly (TOSA) arrangement implementing a parabolic reflector device consistent with the present disclosure as an optical multiplexer.

FIG. 12 shows the example parabolic reflector device 1100 of FIG. 11 implemented as the optical multiplexer 125 within the TOSA arrangement 104 of the optical transceiver module 101 shown in FIG. 1B. As shown, the TOSA arrangement 104 includes the plurality of laser diodes 1150 optically aligned with respective optical coupling ports of the parabolic reflector device 1100 (See FIG. 11). The parabolic reflector device 1100 further includes the optical coupling surface 1414 optically aligned with the optical coupling port 1208-1 to launch a multiplexed optical signal on to the external transmit optical fiber 133 (See FIG. 1A).

In accordance with an aspect, a parabolic reflector device for use within an optical subassembly is disclosed. The parabolic reflector device comprising at least a first parabolic lens member having a light-transmissive body that defines first and second parabolic surfaces, a mirror member having a light-transmissive body that defines a parabolic mating surface to couple to the first parabolic lens member, an angled reflective surface, and an optical coupling surface, and wherein the mirror member and the first parabolic lens member are configured to couple to each other to collectively provide a light-transmissive structure, and wherein the light-transmissive structure is configured to multiplex or demultiplexed an optical signal.

In accordance with another aspect of the present disclosure a multi-channel optical transceiver is disclosed. The multi-channel optical transceiver comprising a housing, a multi-channel transmitter optical subassembly (TOSA) disposed in the housing, the multi-channel TOSA comprising a plurality of laser diodes to emit a plurality of different channel wavelengths, a plurality of parabolic lens members coupled to each other to form a light-transmissive structure that extends from a first end to a second end, each parabolic lens member optically coupled to a corresponding laser diode of the plurality of laser diodes to receive emitted channel wavelengths within the light-transmissive structure and reflect the received channel wavelengths along a light path that extends towards the first end of the light-transmissive structure, a mirror member coupled to the first end of the light-transmissive structure, the mirror member having an angled reflective surface disposed along the light path and an optical coupling surface, the angled reflective surface to reflect channel wavelengths received along the light path from the plurality of laser diodes towards the optical coupling surface to launch the reflected channel wavelengths as a multiplexed optical signal on an external transmit optical fiber, a multi-channel receiver optical subassembly (ROSA) disposed in the housing.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A parabolic reflector device for use within an optical subassembly, the parabolic reflector device comprising:
at least a first parabolic lens member having a light-transmissive body that defines first and second parabolic surfaces;
a mirror member having a light-transmissive body that defines a parabolic mating surface to couple to the first parabolic lens member, an angled reflective surface, and an optical coupling surface; and
wherein the mirror member and the first parabolic lens member are configured to couple to each other to collectively provide a light-transmissive structure, and wherein the light-transmissive structure is configured to multiplex or demultiplex an optical signal.

2. The parabolic reflector device of claim 1, wherein the second parabolic surface of the first parabolic lens member is configured as a short pass or long pass filter such that the second parabolic surface is configured to reflect incident light having a first channel wavelength and pass unassociated channel wavelengths.

3. The parabolic reflector device of claim 2, further comprising an optical coating layer disposed on the second parabolic surface to provide the short pass or long pass filter.

4. The parabolic reflector device of claim 2, further comprising an antireflective coating disposed on the first parabolic surface.

5. The parabolic reflector device of claim 2, wherein the light-transmissive body of the first parabolic lens member defines at least a portion of a first optical coupling port for emitting or receiving channel wavelengths.

6. The parabolic reflector device of claim 5, wherein the first optical coupling port comprises a spherical surface.

7. The parabolic reflector device of claim 6, wherein the spherical surface of the first optical coupling port includes a center aligned with a focus of the second parabolic surface.

8. The parabolic reflector device of claim 6, wherein the spherical surface of the first optical coupling port is at least partially defined by the light-transmissive body of the mirror member when the first parabolic lens member is coupled to the mirror member.

9. The parabolic reflector device of claim 6, wherein the spherical surface is a concave surface.

10. The parabolic reflector device of claim 1, wherein the first parabolic surface of the first parabolic lens member is concave and the second parabolic surface of the first lens member is convex.

11. The parabolic reflector device of claim 1, wherein the first and second parabolic surfaces extend substantially in parallel with each other.

12. The parabolic reflector device of claim 1, further comprising a second parabolic lens member having a light-transmissive body that defines a first parabolic surface and a second parabolic surface, wherein the first parabolic surface of the second parabolic lens member is configured to couple to the first parabolic lens member via the second parabolic surface of the first parabolic lens member.

13. The parabolic reflector device of claim 12, wherein the light-transmissive body of the second parabolic lens member defines at least a portion of a second optical coupling port, and wherein a center of the second optical coupling port is optically aligned with a focus of the second parabolic surface of the second parabolic lens member.

14. The parabolic reflector device of claim 13, wherein the first and second parabolic lens members collectively define the second optical coupling port when the first and second parabolic lens members are coupled to each other.

15. The parabolic reflector device of claim 12, wherein the light-transmissive body of the first parabolic lens member is formed from a first material and the light-transmissive body of the second parabolic lens member is formed from a second material, the first and second materials being a same material or having a same index of refraction.

16. The parabolic reflector device of claim 12, wherein the first and second parabolic lens members collectively define at least a first outer surface of the reflector device when coupled to each other, the first outer surface defining at least first and second spherical optical coupling ports, and wherein the first spherical optical coupling port includes a center optically aligned with a focus of the second parabolic surface of the first lens member and the second spherical optical coupling port includes a center optically aligned with a focus of the second parabolic surface of the second parabolic lens member.

17. The parabolic reflector device of claim 16, wherein the first outer surface is configured to mount the parabolic reflector device to a submount within an optical subassembly.

18. The parabolic reflector device of claim 1, wherein the light-transmissive body of the first parabolic lens member comprises glass.

19. A multi-channel optical transceiver comprising:
a housing;
a multi-channel transmitter optical subassembly (TOSA) disposed in the housing, the multi-channel TOSA comprising:
a plurality of laser diodes to emit a plurality of different channel wavelengths;
a plurality of parabolic lens members coupled to each other to form a light-transmissive structure that extends from a first end to a second end; each parabolic lens member optically coupled to a corresponding laser diode of the plurality of laser diodes to receive emitted channel wavelengths within the light-transmissive structure and reflect the received channel wavelengths along a light path that extends towards the first end of the light-transmissive structure;
a mirror member coupled to the first end of the light-transmissive structure, the mirror member having an angled reflective surface disposed along the light path and an optical coupling surface, the angled reflective surface to reflect channel wavelengths received along the light path from the plurality of laser diodes towards the optical coupling surface to launch the reflected channel wavelengths as a multiplexed optical signal on an external transmit optical fiber; and
a multi-channel receiver optical subassembly (ROSA) disposed in the housing.

20. The multi-channel optical transceiver of claim 19, wherein each parabolic lens member of the plurality of parabolic lens members comprises a first parabolic surface disposed opposite a second parabolic surface, the second parabolic surface configured as a long pass or short pass filter.

21. The multi-channel optical transceiver of claim 19, wherein each parabolic lens member and the mirror member comprises glass.

22. The multi-channel optical transceiver of claim 19, wherein the plurality of parabolic lens members are configured to couple together in a stack configuration whereby the second parabolic surface of each parabolic lens member couples to the first parabolic surface of an adjacent parabolic lens member.

* * * * *